United States Patent [19]

Murachi

[11] Patent Number: 4,671,974
[45] Date of Patent: Jun. 9, 1987

[54] SIDE MOLD

[75] Inventor: Tatsuya Murachi, Nishikasugai, Japan

[73] Assignee: Toyoda Gosei Co., Ltd., Nishikasugai, Japan

[21] Appl. No.: 705,693

[22] Filed: Feb. 26, 1985

[30] Foreign Application Priority Data

Feb. 29, 1984 [JP] Japan .................. 59-029830[U]

[51] Int. Cl.$^4$ .............................................. B60R 13/04
[52] U.S. Cl. ...................................... 428/31; 293/128; 428/40
[58] Field of Search ............... 428/31, 40; 52/716; 293/128

[56] References Cited

U.S. PATENT DOCUMENTS

| | | | |
|---|---|---|---|
| 3,868,433 | 2/1975 | Bartz et al. | 428/461 X |
| 3,914,482 | 10/1975 | Sawa et al. | 428/31 |
| 3,962,833 | 6/1976 | Johnson | 428/40 X |
| 4,272,573 | 6/1981 | Ewald et al. | 428/40 |
| 4,349,592 | 9/1982 | Nussbaum | 428/30 |

Primary Examiner—Henry F. Epstein
Attorney, Agent, or Firm—Cushman, Darby & Cushman

[57] ABSTRACT

A side mold is disclosed which comprises a mold proper formed of a synthetic resin compound incorporating a plasticizer, a one-faced adhesive tape, and a curing adhesive agent containing a polar atomic group, with the one-faced adhesive tape joined fast to the mold proper through the medium of the curing type adhesive agent. Owing to the existence of the curing type adhesive agent layer containing the polar atomic group in the boundary between the rear side of the mold proper and the adhesive tape, even when the plasticizer in the mold proper exudes from the mold proper into the aforementined boundary, it is not allowed to form a layer of its own in the boundary and the otherwise inevitable degradation of the cohesive force of the aforementioned adhesive agent layer is curbed. Thus, sufficient adhesive strength is retained for a long time between the rear side of the mold proper and the adhesive tape.

6 Claims, 1 Drawing Figure

SIDE MOLD

BACKGROUND OF THE INVENTION

1. Field of the Invention

This invention relates to a side molding which comprises a molding proper formed of a synthetic resin compound incorporatimg therein a plasticizer and an adhesive tape integrally joined as fitting means to the molding proper.

2. Description of the Prior Art

The conventional side molding of the type described above has a double-faced adhesive tape having adhesive layers 2 formed on the opposite sides of a substratal film 1 (hereinafter referred to as "double-faced tape") and a molding proper 4 made of synthetic resin (such as, for example, polyvinyl chloride), with the double-faced tape integrally joined through the medium of either of the two adhesive layers 2 to the molding proper 4. The adhesive layer 2 on the opposite side of the molding proper is protected with a peel proper 5. The aforementioned substratal film 1 is generally formed from a flexible foamed material (such as, for example, polyethylene, chloroprene rubber, or acrylic rubber) with a view to absorbing undulations on the rear surface of the molding proper and absorbing vibrations generated in motion. The adhesive agent forming the adhesive layers 2 is required to possess a viscoelastic property at room temperature and exhibit a high adhesive property to both the object of attachment (vehicle) and the substratal film. Generally, an acrylic adhesive agent or a rubbery adhesive agent is selected. In the attached drawing, 7 denotes a metallic insert intended to confer rigidity upon the molding proper 4 and curb thermal expansion of the molding proper. Examples of the plasticizer usable in the molding proper include acid esters such as phthalic esters, aromatic carboxylates, and aliphatic dibasic esters.

The side molding of this nature has had the possibility of inducing separation between the rear side of the molding proper and the adhesive tape after a protracted standing especially after application to the vehicle. The cause for this trouble has not yet been elucidated. It may be explained by a postulate that this separation is caused by the exudation (bleeding) of the plasticizer from within the molding proper. To be specific, when the plasticizer so exuding lacks compatibillity with the adhesive agent, it forms a layer in the boundary between the rear side of the molding proper and the adhesive layer and consequently causes breakage of the boundary. When the exuding plasticizer possesses compatibility with the adhesive agent, it diffuses itself the into adhesive agent to lower the viscosity of the adhesive agent and bring about destruction of cohesion. This trend, when coupled with the deterioration of the adhesive agent, becomes all the more conspicuous when the molding is set in position on the vehicle and exposed directly to the outdoor conditions such as the effects of heat and light.

SUMMARY OF THE INVENTION

In the side molding of the present invention, a molding proper 4 is formed of a synthetic resin compound incorporating therein a plasticizer and one side of the single-faced adhesive tape is integrally joined to the molding proper through the medium of a curing type adhesive agent containing a polar atomic group.

The side molding of the present invention has virtually no possibility of inducing the phenomenon of separation between the molding proper and the adhesive tape even after protracted standing, before or after attachment to the vehicle.

The cause for the absence of the phenomenon remains yet to be elucidated. A logical explanation of this cause may be given by the following postulate. Similar to the conventional side molding, in the side molding of this invention the plasticizer in the molding proper is also apt to exude. Since the adhesive agent contains a polar atomic group, it has high compatibility with the plasticizer which is made of an acid ester. Thus, the exuding plasticizer is diffused into the adhesive agent and, consequently, prevented from forming a layer in the boundary between the rear side of the molding proper and the adhesive tape. The breakage of the boundary, therefore, is not allowed to occur readily. Moreover, since the adhesive agent is of a curing type and has a three-dimensional reticular structure, the diffused plasticizer induces minimal degradation of cohesive force and hardly causes breakage of cohesion;

DESCRIPTION OF THE PREFERRED EMBODIMENT

Figure 1:
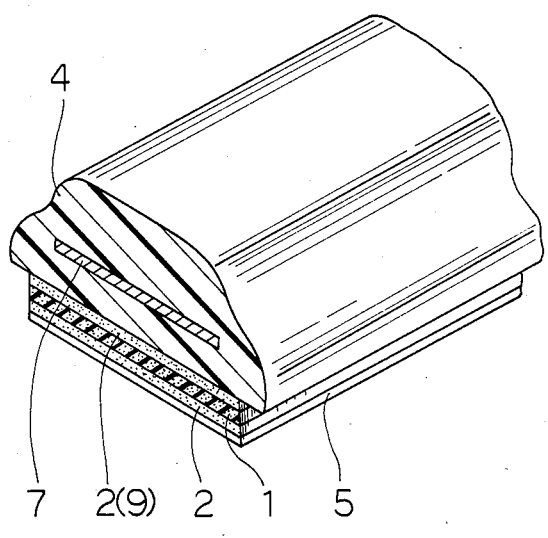
FIG. 1 is a sectioned perspective view illustrating a typical side molding.

With reference to FIG. 1, a one-faced adhesive tape having an adhesive layer 2 formed on only one side of a substratal film 1 is integrally joined to the rear side of a molding proper 4 through the medium of a curing type adhesive agent 9 containing a polar atomic group. The materials of the adhesive layer 2 and the substratal film 1 are the same as those of the counterparts in the conventional side molding.

The curing type adhesive agent containing a polar atomic group described above is not specifically defined. Examples of the adhesive agent include urethane type adhesive agents containing —NHCONH—, CONH—, NHCOO—, —COO—, and —O—, epoxy type adhesive agents containing —O— and —OH, and chloroprene type adhesive agents containing —O— and —Cl. In the case of a liquid reactive adhesive agent such as of the epoxy or urethane type, the adhesive agent is used either in its unaltered form or is dissolved in a suitable solvent. In the case of an adhesive agent of the chloroprene type, the adhesive agent is used is rendered liquid by the addition of a solvent. In either case, the adhesive agent is applied on the rear side of the molding proper and/or on the rear side of the one-faced adhesive tape. After that, the solvent is volatlized when necessary and the molding proper and the adhesive tape are pressed against each other, optionally with the application of heat, to effect fast adhesion of the one-faced adhesive tape to the rear side of the molding proper.

Now, working examples and the test performed on the products of such working examples for adhesive strength will be described below.

The molding proper was obtained by extrusion molding the following polyvinyl chloride (PVC) composition in a cross section as illustrated in FIG. 1.

| (PVC composition) (in parts by weight) | |
|---|---|
| PVC (mean degree of polymerization = 1450) | 100 |
| Plasticizer (DOP) | 80 |
| Stabilizer | 4.4 |

The rear side of the molding proper so produced was wiped clean with a solvent (ethyl acetate). Various adhesive agents shown in Table 1 were applied to the cleaned rear side in a prescribed amount. Then a one-faced adhesive tape (using a substratal film made of foamed polyethylene tape, expansion ration 3000%, 2 mmt) was joined to the molding proper under the conditions of 5 kgf/cm$^2$×1 minute. The side molding so produced was left standing for 200 hours in a Weather-O-Meter (using two arc lamps). In a comparative experiment, a double-faced adhesive tape (using the same substratal film as described above and an acrylic adhesive agent) was joined to the rear side of the molding proper.

The adhesive strength was evaluated by the 180° peel test (at a tensile rate of 30 mm/min.). It is noted from the test results shown in Table 1 that the side moldings of the working examples (according with the present invention) retain sufficient adhesive strength for a long time as compared with the side molding of the comparative experiment.

TABLE 1

| | Adhesive agent | Amount applied (g/m$^2$) | Peel strength (kgf/20 mm)* |
|---|---|---|---|
| Example 1 | Urethane type: reaction product of PPG ($\overline{M}n$ = 1000) and TDI at a OH/NCO molar ratio of ½. | 50 | 0.5 (0.8) |
| Example 2 | Epoxy type: Main component [Bis-Phenol A ($\overline{M}n$ = 380) having an epoxy equivalent weight of 184–194) and 9 PHR of a curing agent (diethylene triamine) added thereto. | 50 | 0.3 (0.7) |
| Example 3 | Epoxy type: Main component (same as in Example 2) and 12 PHR of a curing agent (triethylene tetramine) added thereto. | 50 | 0.4 (0.8) |
| Comparative experiment | Acrylic adhesive agent | — | 0.1 (0.2) |

*Breakage of substratal film observed in all the experiments except for the comparative experiment. Breakage of the boundary (between the rear side of the molding proper and the adhesive layer) was observed in the comparative experiment. The numerals given in the parentheses represent the peel strength before the weather test.

PPG: Polypropylene glycol
TDI: Tolylene diisocyanate
$\overline{M}n$: Number-average molecular weight
PHR: Parts per hundred parts of resin

What is claimed is:

1. A side molding for application to a vehicle comprising
    a molding proper comprising a synthetic resin and a plasticizer for said resin,
    a one-sided adhesive tape integrally attached to the molding proper having an adhesive layer protected with a peel paper facing away from the molding proper for attaching the side molding to the vehicle, and
    interposed between the molding proper and the adhesive tape a curing-type adhesive compatible with said plasticizer and having polar atomic groups to integrally attach the adhesive tape to the molding proper.

2. A side mold according to claim 1, wherein said curing resin adhesive agent is a urethane resin adhesive agent containing —NHCONH—, —CONH—, —NHCOO—, —COO—, or —O—.

3. A side mold according to claim 1, wherein said curing resin adhesive agent is an epoxy resin adhesive agent containing —O— or —OH.

4. A side mold according to claim 1, wherein said curing rubber adhesive agent is a chloroprene rubber adhesive agent containing chlorine.

5. The side molding according to claim 1 in which the curing type adhesive is selected from the group consisting of a urethane resin adhesive, an epoxy resin adhesive and a chloroprene rubber adhesive.

6. A method of securing a molding proper, composed of a synthetic resin and a plasticizer for the resin, to the non-adhesive side of a one-sided adhesive tape to form a side molding for attachment to a vehicle, said method comprising applying a curing-type adhesive to the point of attachment between the non-adhesive side of the one-sided adhesive tape and the molding proper, the curing-type adhesive being compatible with the plasticizer in the molding proper and having polar atomic groups to integrally attach the adhesive tape to the molding proper and is selected from the group consisting of a urethane resin adhesive, an epoxy resin adhesive and a chloroprene resin adhesive, the curing type adhesive forming a bond between the non-adhesive side of the tape and the molding proper which is resistant to the effects of heat and light and to any plasticizer that exudes from the molding proper and contacts the curing-type adhesive, and protecting the adhesive layer with a peel off paper.

* * * * *